(12) United States Patent
Huang et al.

(10) Patent No.: US 10,442,637 B2
(45) Date of Patent: Oct. 15, 2019

(54) LINEAR DRIVE SYSTEM HAVING CENTRAL, DISTRIBUTED AND GROUP CONTROL

(71) Applicant: MagneMotion, Inc., Devens, MA (US)

(72) Inventors: Yuhong Huang, Acton, MA (US); Brian M. Perreault, Stow, MA (US); Eric J. Wildi, Lexington, MA (US); Mark R. Cooper, Eden Prairie, MN (US); Robert H. Schmidt, Germantown, WI (US)

(73) Assignee: MagneMotion, Inc., Devens, MA (US)

( * ) Notice: Subject to any disclaimer, the term of this patent is extended or adjusted under 35 U.S.C. 154(b) by 128 days.

(21) Appl. No.: 15/710,977

(22) Filed: Sep. 21, 2017

(65) Prior Publication Data

US 2019/0084781 A1    Mar. 21, 2019

(51) Int. Cl.
*B65G 54/02* (2006.01)
*B65G 35/06* (2006.01)
*B65G 43/00* (2006.01)
*B60L 13/03* (2006.01)
*B60L 15/38* (2006.01)
*G05B 19/19* (2006.01)

(52) U.S. Cl.
CPC .............. *B65G 54/02* (2013.01); *B60L 13/03* (2013.01); *B60L 15/38* (2013.01); *B65G 35/06* (2013.01); *B65G 43/00* (2013.01); *G05B 19/195* (2013.01); *B60L 2200/26* (2013.01); *B65G 2203/0283* (2013.01)

(58) Field of Classification Search
CPC ........ B65G 35/06; B65G 43/00; B65G 54/02; B65G 2203/0283; H02K 41/02; H02K 41/031; H02K 41/03; H02P 6/006; B60L 13/03; B60L 15/38; B60L 2200/26; G05B 19/195
See application file for complete search history.

(56) References Cited

U.S. PATENT DOCUMENTS 7,458,454 B2 * 12/2008 Mendenhall ........... B65G 35/06
198/377.02
8,616,134 B2 * 12/2013 King ..................... B60L 13/003
104/284

(Continued)

FOREIGN PATENT DOCUMENTS

EP    3 196 719    7/2017

OTHER PUBLICATIONS

Extended European Search Report for Application 18195836.4-1205 dated May 28, 2019 (13 pages).

*Primary Examiner* — Gene O Crawford
*Assistant Examiner* — Keith R Campbell
(74) *Attorney, Agent, or Firm* — Boyle Fredrickson, S.C.

(57) ABSTRACT

A linear drive system provides a combination of distributed control to increase the number of movers which may be supported in the system and centralized control to reduce the separation distance between movers by grouping movers together and placing a reference mover of the group under central control with remaining movers of the group under distributed control. In addition, in precise working locations, or "synchronization zones," each of the movers can be temporarily placed under central control to further reduce the separation distance and allow improved coordination with industrial processes or machines in the system.

13 Claims, 7 Drawing Sheets

(56) References Cited

U.S. PATENT DOCUMENTS

| | | | | |
|---|---|---|---|---|
| 8,863,669 | B2* | 10/2014 | Young | B60L 15/005 |
| | | | | 104/292 |
| 9,847,742 | B2* | 12/2017 | Suzuki | H02P 6/006 |
| 2011/0125350 | A1 | 5/2011 | Won et al. | |
| 2012/0247925 | A1 | 10/2012 | Cooke | |
| 2015/0344233 | A1* | 12/2015 | Kleinikkink | G05B 19/00 |
| | | | | 700/230 |
| 2016/0355350 | A1* | 12/2016 | Yamamoto | G05B 19/4189 |
| 2017/0229991 | A1 | 8/2017 | Huber et al. | |

* cited by examiner

LINEAR DRIVE SYSTEM HAVING CENTRAL, DISTRIBUTED AND GROUP CONTROL

BACKGROUND INFORMATION

The present invention relates to motion control systems and, more specifically, to a linear drive system in a motion control system, where movers are arranged in a group with one mover being a reference mover and any other mover being a grouped mover, in which motion of the reference mover is determined according to a motion profile defined by a central controller, or segment controller of any track segment in which the grouped mover is traveling, and motion of any grouped mover is determined according to an offset with respect to the reference mover.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a path, which could be a closed path, over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

One manner of controlling movers on a track is known as "centralized" control. Under centralized control, a single controller is used to define precise, time dependent motion for movers traveling on the track. With centralized knowledge of the motion of each mover, such control can advantageously allow movers to move more closely together along the track with less concern of collision. Also, such control can advantageously allow improved coordination with industrial processes or machines to which the movers align. However, centralized controllers may be limited in the maximum number of axes available for defining motion for each of the movers. As a result, the system may be limited with respect to a maximum number of movers which may be supported unless increased resources are provided.

Another manner of controlling movers on a track is known as "distributed" control. Under distributed control, segment controllers corresponding to segments of the track are used to define the motion for the movers which travel on their respective segments. As movers transition from one segment to another, the segment controllers can transfer control with respect to the movers to next segment controllers. By not requiring each mover to be controlled by a common, centralized controller, such distributed control can enable larger automatic assembly lines with large numbers of movers in the system. However, distributed controllers may still be limited with respect to a maximum number of movers which may be supported in the system in order to ensure collision avoidance. In particular, without centralized knowledge of the motion of each mover, the segment controllers typically maintain a minimum separation distance between movers which would allow one mover to avoid a collision should an adjacent mover come to an immediate stop. This is also referred to as "brick-wall" collision avoidance in which it is desirable for a mover to avoid a collision if an adjacent mover should come to an immediate stop, thereby appearing like the mover collided with a brick-wall.

Thus, it would be desirable to provide a linear drive system which eliminates one or more of the foregoing disadvantages.

BRIEF DESCRIPTION

A linear drive system provides a combination of distributed control to increase the number of movers which may be supported in the system and centralized control to reduce the separation distance between movers by grouping movers together and placing a reference mover of the group under central control with remaining movers of the group under distributed control. In addition, in precise working locations, or "synchronization zones," each of the movers can be temporarily placed under central control to further reduce the separation distance and allow improved coordination with industrial processes or machines in the system.

In one aspect of the invention, a Tour Group Operation (TGO) mode can be provided for independently controlling movers/vehicles. In the TGO mode, a dynamically selected group of adjacent vehicles on the track can be grouped together in a "tour group." One vehicle, which could be the lead vehicle, is designated as a reference vehicle or Tour Guide Vehicle (TGV). All vehicles in the same tour group following the TGV can be instructed to maintain an ordered distance with respect to the TGV, or an ordered distance with respect to one another, chaining with respect to TGV.

In the absence of centralized control, the TGV can generate its own motion profile. The group of vehicles can move synchronously as one independently controlled vehicle. When the TGV is under centralized control, the TGV can receive and follow a motion profile from the centralized controller. The group of vehicles can move synchronously as one controlled vehicle.

Vehicles in a same tour group, with the exception of the TGV, can be controlled by the centralized controller, or segment controllers of the track segments (the motor). Consequently the number of motion axes maintained by the centralized controller can be significantly reduced by vehicle grouping. Accordingly, TGO can enable the centralized controller to control systems with larger numbers of vehicles. The architecture can include: (a) dividing all vehicles into groups; (b) placing the lead vehicle, the TGV, under centralized control; (c) placing the rest of the vehicle in the group under distributed/segmented control; and (d) maintaining specified vehicle spacing of all vehicles within the same group.

In another aspect of the invention, throughput at a given work station on a track can be improved by implementing synchronized vehicle control. A section of the track within a given work station can be constructed as a "synchronization zone." The segments of the track can be connected to synchronization-control hardware. In the synchronization zone, motion profiles are no longer generated per vehicle under distributed control, but rather under centralized control. Effectively the vehicles are temporarily put under centralized control in the synchronization zone. Vehicle spacing smaller than that under brick-wall control can be achieved by carefully calculated motion profiles for all vehicles in the synchronization zone.

Accordingly, in one control scheme, a vehicle, typically a lead vehicle, can be designated to be a reference vehicle during an ordered move. The profile of the reference vehicle can be used to generate the profiles of vehicles that follow the lead vehicle. The following vehicles then follow the generated profiles above without the need to calculate their own motion profiles, as would be the case under ordinary distributed control. The calculated profile typically involves simple addition or subtraction of a constant following distance, or "offset," thereby requiring minimal computational overhead of the segment controller. As a result, overall CPU computational bandwidth may be reduced by simplification of profile generation of all following vehicles.

In another control scheme, a customized motion profile can be stored in a controller's non-volatile memory. This pre-configured profile can be used as a reference profile in lieu of a profile of the referenced vehicle in the scheme.

Specifically then, one aspect of the present invention provides a linear drive system including: multiple movers, in which each of the movers includes at least one position magnet mounted to the mover; a track including multiple track segments defining a path along which each of the movers travels, in which each of the track segments includes: (a) multiple drive coils spaced along the track segment; and (b) a segment controller configured to operate the drive coils, in which operating a drive coil proximal to a mover causes the mover to travel along a portion of the track segment; and a central controller in communication with the segment controllers, in which the movers are arranged in a group with one mover of the movers being a reference mover and any other mover of the movers being a grouped mover, in which motion of the reference mover is determined according to a motion profile defined by the central controller, and in which motion of any grouped mover is determined according to a motion profile defined by a segment controller of any track segment in which the grouped mover is traveling.

Another aspect of the present invention provides a linear drive system including: multiple movers, in which each of the movers includes at least one position magnet mounted to the mover; a track including a multiple track segments defining a path along which each of the movers travels, in which each of the track segments includes: (a) multiple drive coils spaced along the track segment; and (b) a segment controller configured to operate the drive coils, in which operating a drive coil proximal to a mover causes the mover to travel along a portion of the track segment; and a central controller in communication with the segment controllers, in which motion of a mover is determined according to a motion profile defined by a segment controller of any track segment in which the mover is traveling, and in which a section of the track is a synchronization zone, in which the motion of the mover is determined according to a motion profile defined by the central controller instead of a segment controller when the mover is in the synchronization zone.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In one embodiment, track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

Figures 2, 3:
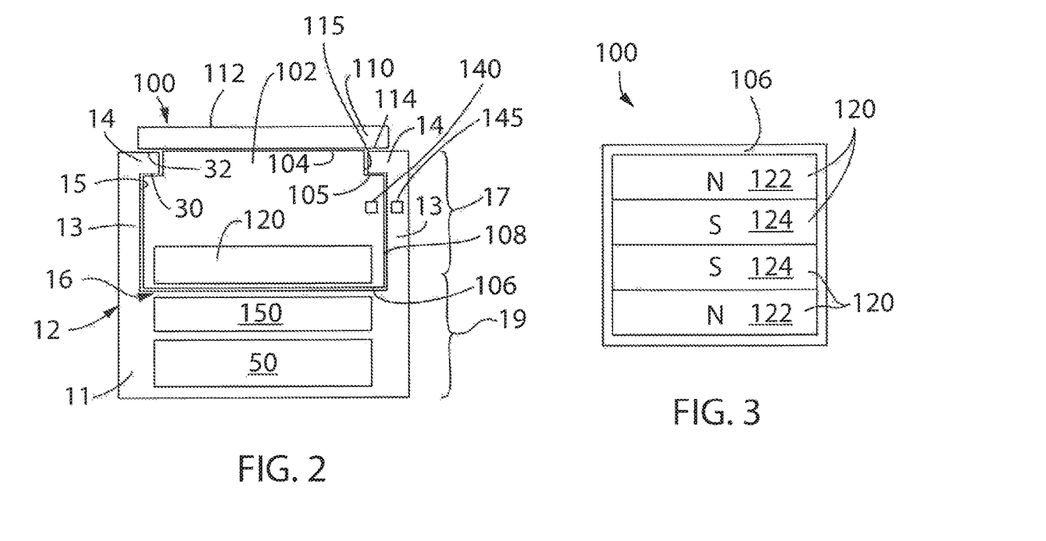
FIG. 2 is a sectional view of an exemplary mover and track segment included in the linear drive system taken at 2-2 of FIG. 1.
FIG. 3 is a bottom plan view of the exemplary mover of FIG. 2.
Figure 4:
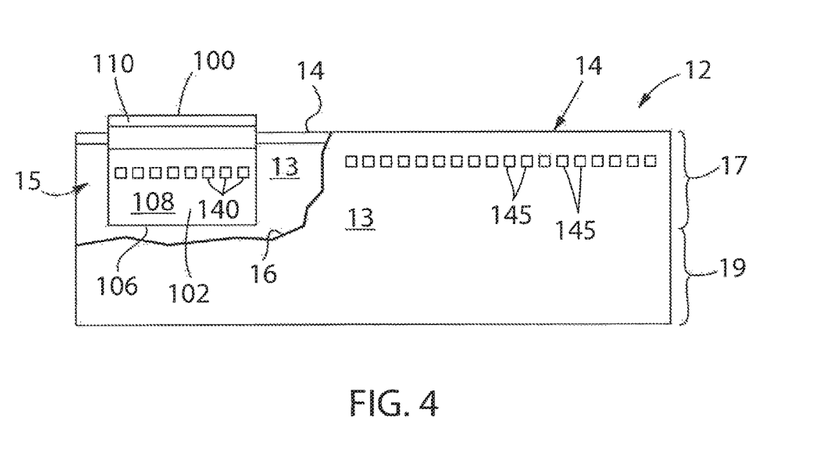
FIG. 4 is a partial side cutaway view of the mover and track segment of FIG. 2.

According to the illustrated embodiment, each mover 100 is configured to slide along the channel 15 as it is propelled by a linear drive system. The mover 100 includes a body 102 configured to fit within the channel 15. In one embodiment, the body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 15 in which the rail 14 runs. The channel 15 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing inward to the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
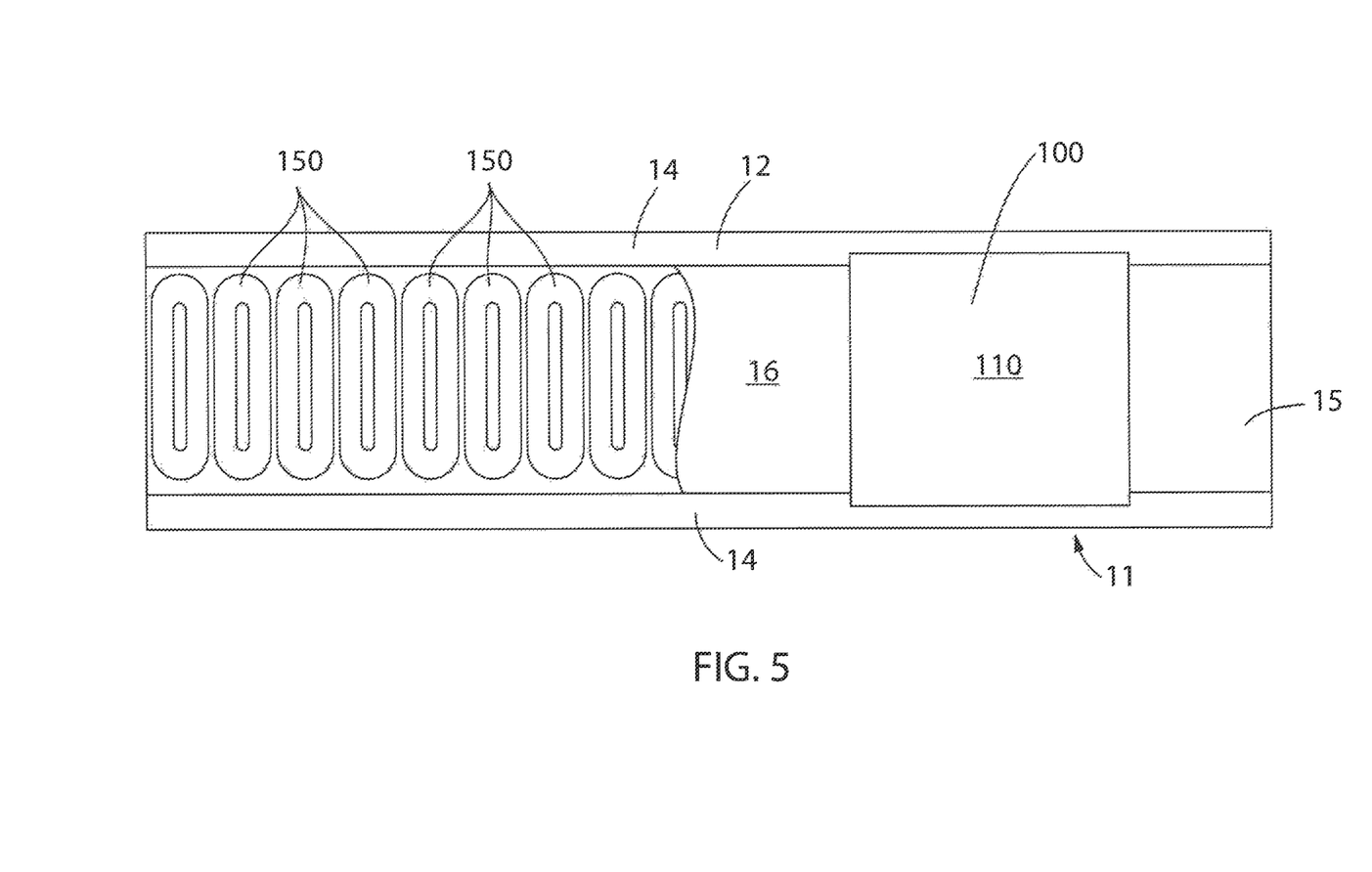
FIG. 5 is a partial top cutaway view of the mover and track segment of FIG. 2.

The linear drive system further includes a series of coils 150 spaced along the length of the track segment 12. With reference also to FIG. 5, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

A segment controller 50 is provided within each track segment 12 to control the linear drive system and to achieve the desired motion of each mover 100 along the track segment 12. Although illustrated as blocks in FIG. 1 external to the track segments 12, the illustration is to facilitate illustration of interconnects between controllers. As shown in FIG. 2, it is contemplated that each segment controller 50 may be mounted in the lower portion 19 of the track segment 12. Each segment controller 50 is in communication with an adjacent segment controller 50 and a central controller 170 which is, in turn, in communication with an industrial controller 200. Accordingly, each segment controller 50 can interact with other controllers to establish routing and global move parameters to re-create overall commands from the industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as the travel along the line. In other embodiments, robotic assembly stations may perform various assembly and/or machining tasks on workpieces carried along by the movers 100. The exemplary industrial controller 200 includes a power supply 202 with a power cable 204 connected, for example, to a utility power supply; a communication module 206 connected by a network medium 160 to the central controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 where the central controller 170 operates to generate commands for each segment controller 50.

Figure 6:
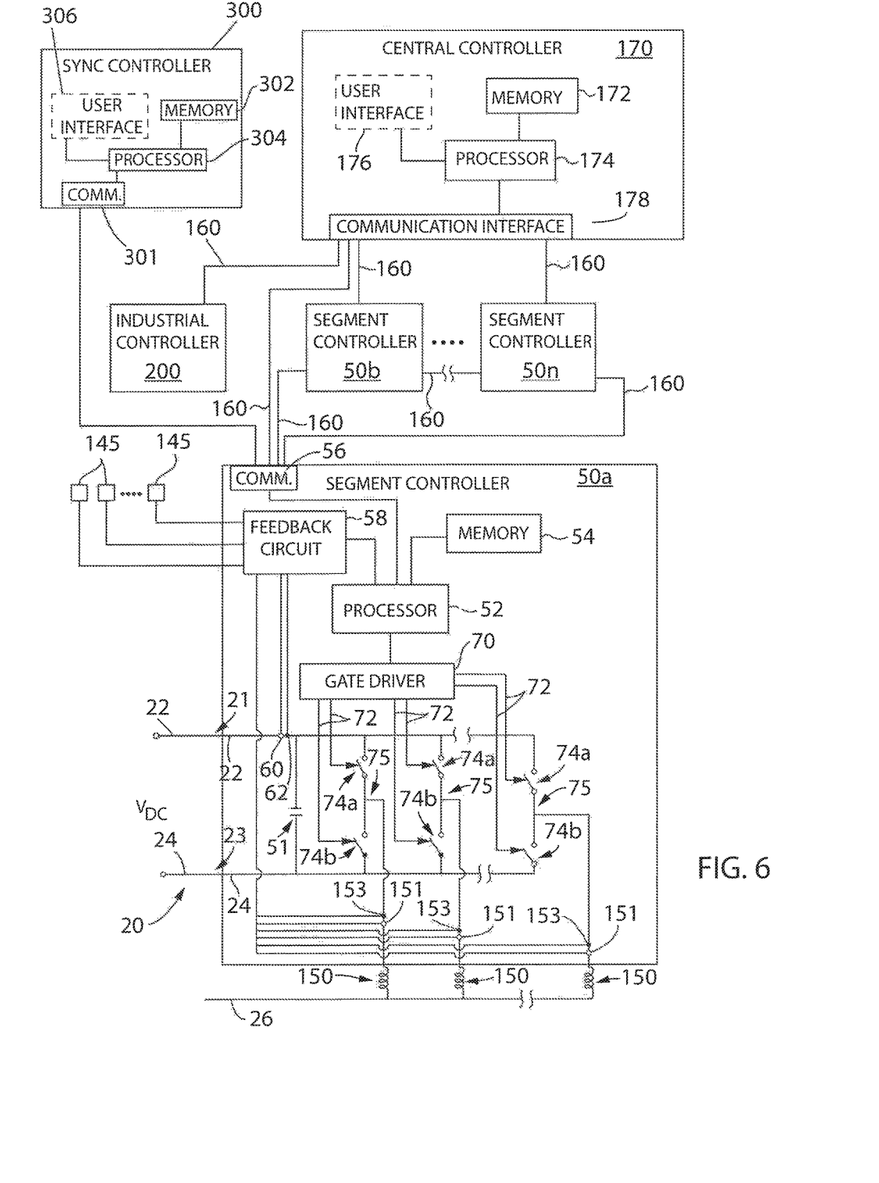
FIG. 6 is a block diagram representation of the exemplary control system of FIG. 1.

With reference also to FIG. 6, the central controller 170 includes a processor 174 and a memory device 172. It is contemplated that the processor 174 and memory device 172 may each be a single electronic device or formed from multiple devices. The processor may be a microprocessor. Optionally, the processor 174 and/or the memory device 172 may be integrated on a field programmable array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 can receive instructions for coordinating with industrial processes or machines. In one aspect, known as "centralized" control, the central controller 170 can determine one or more motion profiles for the movers 100 to follow along the track 10. A program executing on the processor 174 is in communication with each segment controller 50 on each track segment via a network medium 160. The central controller 170 may transfer the one or more motion profiles to segment controllers 50 for execution of the motion profiles to move the movers 100. However, in another aspect, known as "distributed" control, the central controller 170 may be configured to transfer the information from the industrial controller 200 identifying one or more desired movers 100 to be positioned at or moved along the track segment 12, and the segment controllers 50 may determine the appropriate motion profile for each mover 100. Distributed control can minimize the amount of communication in the system by allowing segment controllers 50 to control the movers 100 (as opposed to the central controller 170).

A position feedback system provides knowledge of the location of each mover 100 along the length of the track segment 12 to the segment controller 50. In one embodiment, the position feedback system can include one or more position magnets 140 mounted to the mover 100 and an array of sensors 145 spaced along the side wall 13 of the track segment 12. The sensors 145 are positioned such that each of the position magnets 140 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 which corresponds to the magnet 140 passing the sensor 145.

The segment controller 50 also includes a communication interface 56 that receives communications from the central controller 170 and/or from adjacent segment controllers 50 in a path. The communication interface 56 extracts data from the message packets on the communication network and passes the data to a processor 52 executing in the segment controller 50. The processor may be a microprocessor. Optionally, the processor 52 and/or a memory device 54 within the segment controller 50 may be integrated on a field programmable array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

In one embodiment, the processor 52 can also receive feedback signals from sensors providing an indication of the current operating conditions within the power segment or of the current operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver 70 generate switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Figure 1:
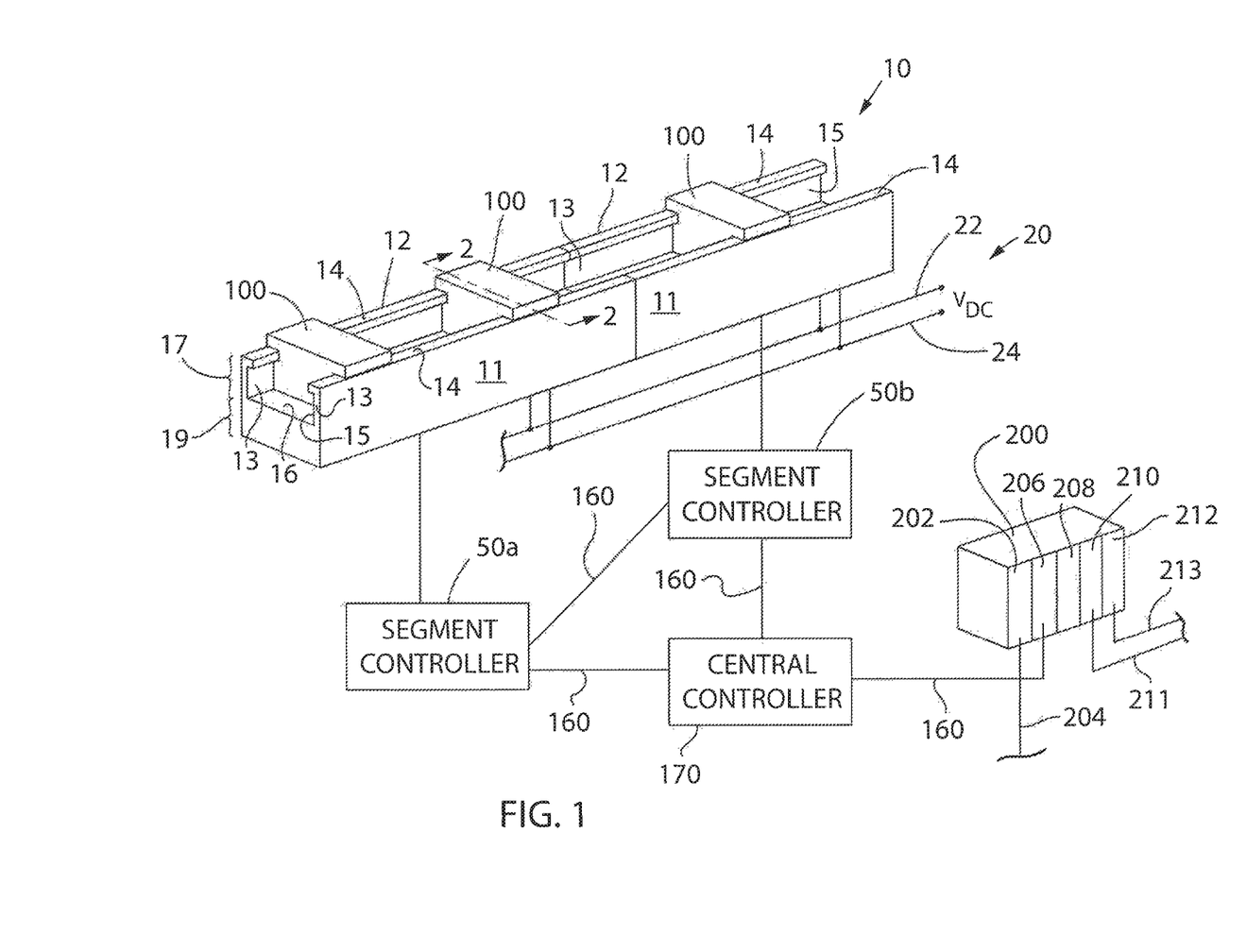
FIG. 1 is a schematic representation of an exemplary control system for a linear drive system according to one embodiment of the invention.

In operation, the central controller 170 receives a command from an external controller, such as the industrial controller 200 shown in FIG. 1, corresponding to a desired location, trajectory or motion for each mover 100. For particular movers 100 on the track 10 and/or movers 100 on particular synchronization sections of the track 10 (known as "synchronization zones") in which synchronized control is desired, a synchronization controller 300 ("sync controller") can perform processing on the information from the industrial controller 200 to generate one or more motion profiles, including commands with respect to speed, position and time, and transmit such motion profiles to the corresponding segment controller 50. The synchronization controller 300 can include a a communication interface 301, a memory device 302, a processor 304 and an optional user interface 306 for an operator to configure the synchronization controller 300 and to load or configure desired motion profiles for the movers 100 in synchronization zones. The synchronization controller 300 includes one or more programs stored in the memory device 302 for execution by the processor 304. The synchronization controller 300 can receive instructions for synchronizing the movers 100 in synchronization zones as described below with respect to FIGS. 7 and 8. In synchronization zones, the synchronization controller 300 can determine motion profiles for the movers 100 to follow along the track 10. A program executing on the processor 304 is in communication with each segment controller 50 on each track segment corresponding to a synchronization zone via a network medium 160. The synchronization controller 300 may transfer the one or more motion profiles to segment controllers 50 for the synchronization zones for execution of the motion profiles to move the movers 100.

In addition, for particular movers 100 on the track 10 and/or movers 100 on remaining areas of the track 10 in which distributed control is desired, the central controller 170 can relay the information from the industrial controller 200 to the appropriate segment controller 50 with the corresponding mover 100 present along the track segment 12.

The segment controller 50, in turn, controls operation of the mover 100 to execute the motion profile, whether generated by the central controller 170 or generated locally. The segment controller 50 may include a position and/or a velocity loop to regulate the position of each mover 100. Each mover 100 includes at least one position magnet 140 and, according to the illustrated embodiment, each mover 100 includes an array of position magnets 140 mounted on the mover 100. In another aspect, one or more magnets can instead be used as both the drive magnet and the position magnet. The position magnets 140 pass by an array of position sensors 145 as the mover 100 travels along the track segment, generating position feedback signals 225. A position loop may utilize the position feedback signals 225 directly to regulate the position of the mover 100 to achieve a desired position or desired position profile along the track segment 12. The processor 52 in the segment controller 50 may also convert the position feedback signals 225 to a velocity feedback signal according to known methods and provide the velocity feedback signal to a velocity loop to achieve a desired speed or desired speed profile along the track segment 12.

Figure 7:
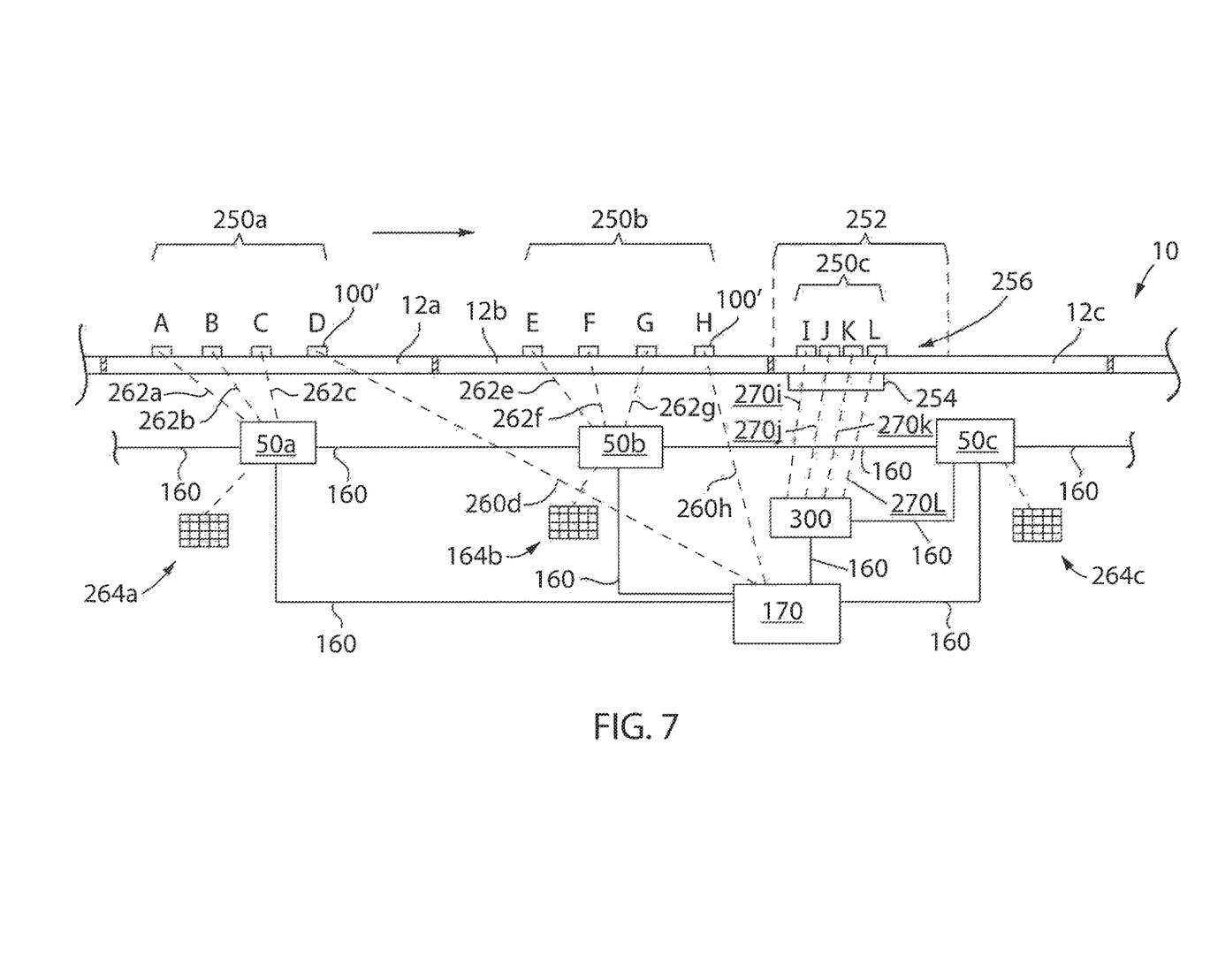
FIG. 7 is a logical representation of the exemplary control system of FIG. 1 in which movers are placed under central, distributed and group control.
Figure 8:
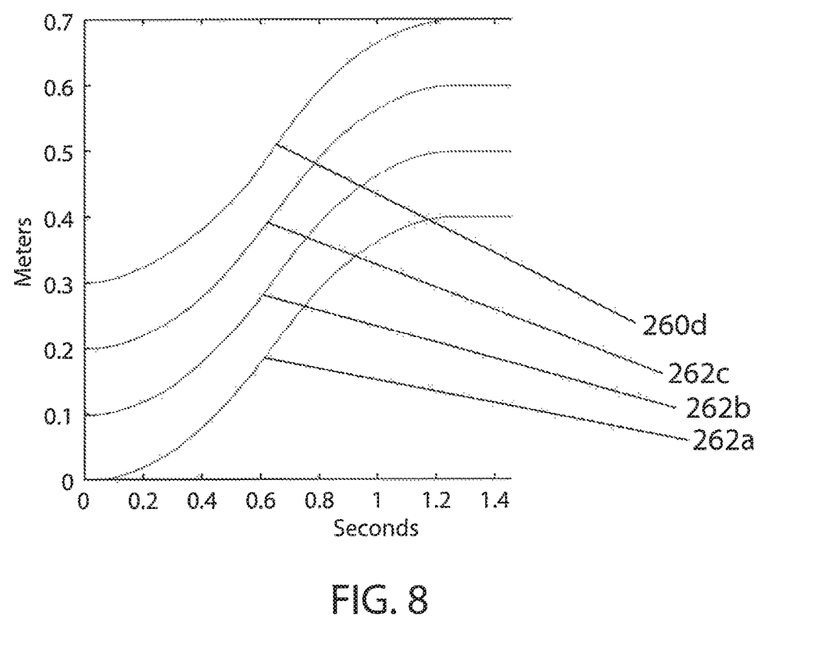
FIG. 8 is an exemplary motion profile and offsets for a particular group of movers in FIG. 7.

Referring to FIG. 7, a logical representation of the exemplary control system of FIG. 1 is provided in accordance with an aspect of the invention. The illustrated linear drive system can provide a combination of distributed control to increase the number of movers 100 which may be supported in the system and/or centralized control to reduce the separation distance between movers 100 by grouping movers 100 together into groups 250 and assigning a reference mover 100' of each group 250 with remaining movers 100 of the group 250 following the reference mover. In addition, in precise working locations, or synchronization zones 252, each of the movers 100 can be temporarily placed under the control of a synchronization controller 300 to further reduce the separation distance and allow improved coordination with industrial processes or machines 254 in the system.

By way of example, a first set of movers 100, identified as movers A, B, C and D, can be placed in a first group 250a, and a second set of movers 100, identified as movers E, F, G and H, can be placed in a second group 250b. In addition, one of the movers 100 of each group 250 can be designated as a reference mover 100'. For example, in the first group 250a, mover D may be a reference mover 100', with movers A, B and C being "grouped movers" following the reference mover D in a direction of travel along the track 10, and in the second group 250b, mover H may be a reference mover 100', with movers E, F and G being "grouped movers" following the reference mover H in a direction of travel along the track 10. Accordingly, the first and second groups 250a and 250b, respectively, are in Tour Group Operation (TGO) mode. Although the reference mover 100' is shown as the lead mover 100 of each group 250 for convenience and ease of understanding, it should be appreciated that assignment of the reference mover 100' could be given to any one of the movers 100 of the group 250 within the scope of the invention.

In TGO mode, motion of the reference mover 100' for each group 250 can be determined according to a motion profile 260 defined by the central controller 170 or a segment controller 50 of any track segment 12 in which the reference mover 100' is traveling. For example, motion for reference movers D and H for the first and second groups 250a and 250b can be determined according to motion profiles 260d and 260h, respectively, as defined by the central controller 170. However, alternatively, motion for reference movers D and H for the first and second groups 250a and 250b, respectively, can be determined according to motion profiles as defined by a segment controller 50 of any track segment 12 in which the reference mover 100' is traveling, such as the segment controller 50a for the reference mover D, and the segment controller 50b for the reference mover H. Motion of any grouped mover 100 is determined as an offset from the reference mover 100' by a segment controller 50 of any track segment 12 in which the grouped mover 100 is traveling. For example, motion for grouped movers A, B and C in the first group 250a is determined according to motion profiles 262a, 262b and 262c, respectively, which could reflect offsets with respect to the reference mover D as defined by segment controller 50a while grouped movers A, B and C are traveling on track segment 12a. Similarly, motion for grouped movers E, F and G in the second group 250b is determined according to motion profiles 262e, 262f and 262g, respectively, which could reflect offsets with respect to the reference mover H as defined by segment controller 50b while grouped movers E, F and G are traveling on track segment 12b. Accordingly, the grouped movers 100 of each group 250 are under distributed control based on offsets in the group, which may be incrementally increasing predetermined separation distances for each of the grouped movers 100.

As reference movers 100' (D and H) transition from one track segment 12 to the next, reference movers 100' can remain under the control of the motion profile 260 defined by the central controller 170, and/or transition under the control of the one segment controller 50 to the next. However, as grouped movers 100 (A, B, C and E, F, G) transition from one track segment 12 to the next, control of the grouped movers 100 can transition from one segment controller 50 to the next. For example, as grouped mover C transitions from track segment 12a to track segment 12b (following reference mover D), control with respect to the motion profile 262c of grouped mover C (which could reflect an offset relative to reference mover D) transitions from segment controller 50a providing the motion profile 262c to segment controller 50b providing the motion profile 262c.

In one aspect, this distributed control transition can be realized by each segment controller 50 maintaining a data structure storing records 264 for each mover 100 that is located on its respective track segment 12. Each record 264 can include for a respective mover 100: a unique identifier; a maximum velocity rating; a maximum acceleration rating; a destination; a group assignment identifier; and/or a centralized control or distributed control flag. Each segment controller 50 can detect presence of a mover 100 on its respective track, including with respect to position, velocity, and in some embodiments, unique identifier. Also, each segment controller 50 can receive a message from a neighboring segment controller 50 for incoming movers 100, and each segment controller 50 can send a message to a neighboring segment controller 50 for outgoing movers 100, via the network medium 160. Accordingly, as a grouped mover 100 transitions from one track segment 12 to the next, one segment controller 50 can send a message to an adjacent segment controller 50 including a record 264 for the grouped mover 100, and the adjacent segment controller 50 can receive the message and the record 264 and detect presence of the incoming grouped mover 100. When a group 250 transitions from one segment controller 50 to the next, motion profiles can be correspondingly communicated from one segment controller 50 to the next, including from a segment controller 50 for a track segment 12 on which a reference mover 100' is traveling to another segment controller 50 for another track segment 12 with the rest of the group 250, as motions for the grouped movers 100 are based on the reference mover 100'. In some aspects, the reference mover 100' can span more than one track segment 12, and motion profiles (which could be adjusted for the next mover 100 in line) could be passed from one segment controller 50 to the next until the end of a group 250 is reached.

Providing TGO mode allows more movers 100 to be controlled with greater flexibility. To maximize efficiency, each segment controller 50 can provide motion profiles 262 for grouped movers 100 to move as closely as possible to the reference mover 100', with reduced separation distance. Accordingly, while grouped movers 100 are travelling on a track segment 12 corresponding to a segment controller 50, that segment controller 50 can execute to move the grouped movers 100 into close positions with respect to the reference mover 100', following one another, based on the maximum velocity and acceleration ratings of the respective movers 100. For example, with additional reference to FIG. 8, based on detection of the reference mover D moving through a motion profile 260d, using the sensors 145, the segment controller 50a, in turn, can define and execute motion profiles 262a, 262b and 262c for grouped movers A, B and C, respectively, to follow the reference mover D with an offset that is a predetermined, ordered separation distance. Also, such predetermined separation distance can be a minimal separation distance as determined by the segment controller 50 based on the maximum velocity and acceleration ratings of the respective movers 100.

Referring again to FIG. 7, in synchronization zones 252, all movers 100, whether grouped or otherwise, can be temporarily placed under synchronized control to allow individual control of each mover 100 for improved coordination with industrial processes or machines 254 in the system, such as actuators configured to interact with the movers 100. Such synchronized control, in combination with the TGO mode, can also allow a reduced separation distance as compared to brick wall control. In one aspect, a section 256 of the track 10 could be a synchronization zone 252. In the synchronization zone 252, motion profiles 270 for any mover 100 can be defined by the synchronization controller 300, including reference movers 100' which might otherwise be controlled by the controller 170. For example, in the synchronization zone 252, which might be located on track segment 12c, movers I, J, K and L, which might otherwise comprise a third group 250c of movers 100 elsewhere on the track 10, are each placed under synchronized control, which control is carried out by the segment controller 50c. Accordingly, motion for movers I, J, K and L are determined according to motion profiles 270i, 270j, 270k and 270l, respectively, as defined by the synchronization controller 300, so that the movers I, J, K and L can be spaced even more closely together as illustrated and can be aligned more precisely with the industrial processes or machines 254. Although the synchronization zone 252 in FIG. 7 is shown as corresponding to a single track segment 12c by way of example, in other configurations, the synchronization zone 252 can span multiple track segments 12.

While movers 100 can be processed in the synchronization zone 252 under synchronized control, in another aspect of the invention, movers 100 can also be processed by varying the TGO mode as described above with respect to FIG. 7. Referring to FIGS. 9A-9E, various states for another exemplary synchronization zone 252' on the track 10 are shown in accordance with an aspect of the invention. The synchronization zone 252' can be a working area 274 in which movers 100 can be precisely positioned with the industrial processes or machines 254, such as actuators configured to interact with the movers 100, with minimal separation distances, by varying grouping modes. For efficient operation, a queuing area 272 may precede the working area 274, and an exit area 276 may follow the working area 274. In the queuing area 272, movers 100 can arrive in a preexisting group mode, and in the exit area 276, movers 100 can exit with the preexisting group mode.

Figure 9A:
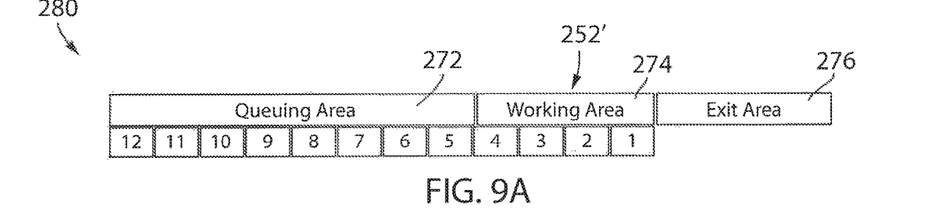
FIGS. 9A-9E illustrate exemplary states for another mechanism by which grouping modes can be varied according to an embodiment of the invention.

In FIG. 9A, in a first state 280, movers 1-4 have been processed in the working area 274. Meanwhile, movers 5-12 arrive in the queuing area 272 to wait for processing in their preexisting modes.

Figure 9B:
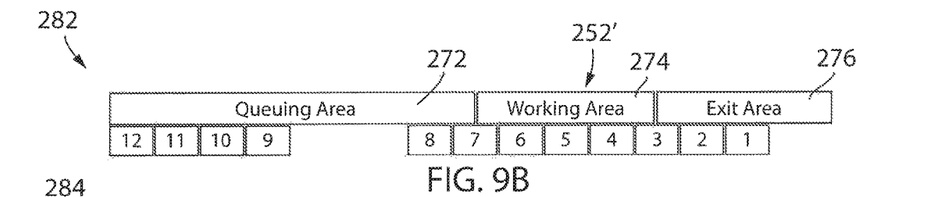

Next, in FIG. 9B, in a second state 282, movers 1-8 are formed into a TGO group of eight with mover 1 being the TGV or reference mover 100'. Then, the TGO group of eight can be moved the equivalent of four mover lengths so that movers 5-8 are in the working area 274 and movers 1-4 are out of the working area 274.

Figure 9C:
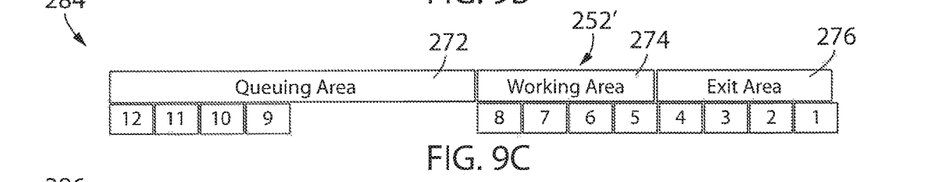

Next, in FIG. 9C, in a third state 284, movers 5-8 can be positioned in the working area 274. Accordingly, movers 5-8 are ready to be processed.

Figure 9D:
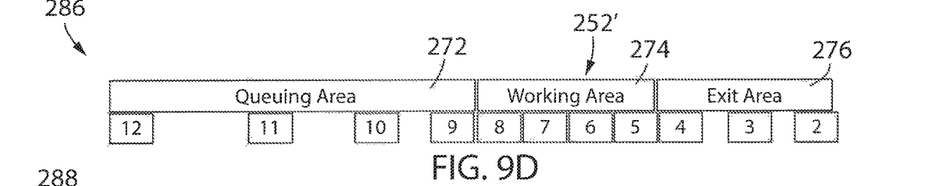

Next, in FIG. 9D, in a fourth state 286, while movers 5-8 are been processed, movers 1-4 can be formed into a TGO group of four with mover 1 being the TGV or reference mover 100'. Then, movers 1-4 can leave the exit area as a TGO group. Meanwhile, movers 9-12 can move closer to the working area 274 in the queuing area 272.

Figure 9E:
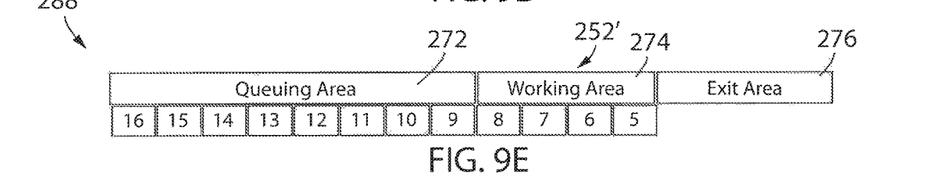

Then, in FIG. 9E, in a fifth state 288, movers 5-8 can be processed. These states may then continuously repeat, back to the first state 280, to efficiently process movers 100 in relation to the industrial processor machine 254 in the working area 274 with minimal separation distance and improved alignment.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A linear drive system comprising:
a plurality of movers, wherein each mover of the plurality of movers includes at least one position magnet mounted to the mover;
a track including a plurality of track segments defining a path along which each mover of the plurality of movers travels, wherein each of the plurality of track segments includes:
(a) a plurality of drive coils spaced along the track segment; and
(b) a segment controller configured to operate the plurality of drive coils, wherein operating a first drive coil of the plurality of drive coils proximal to a first mover of the plurality of movers causes the first mover to travel along a portion of the track segment; and
a central controller in communication with the segment controllers,
wherein the plurality of movers are arranged in a group with one mover of the plurality of movers being a reference mover and any other mover of the plurality of movers being a grouped mover,
wherein motion of the reference mover is determined according to a motion profile defined by the central controller or the segment controller of any of the plurality of track segments in which the one or more grouped movers is traveling, and
wherein motion of the one or more grouped movers is determined according to an offset with respect to the reference mover, and
further comprising a synchronization controller in communication with the central controller, wherein a section of the track is a synchronization zone, and wherein a motion profile for the one or more grouped movers in the synchronization zone is defined by the synchronization controller instead of the central controller or the segment controller of any of the plurality of track segments when the one or more grouped movers is in the synchronization zone.

2. The system of claim 1, wherein each segment controller is configured to define a motion profile for the one or more grouped movers to cause the one or more grouped movers to maintain a predetermined separation distance from the reference mover on any of the plurality of track segment in which the one or more grouped movers is traveling.

3. The system of claim 1, wherein the reference mover leads the one or more grouped movers in a direction of travel along the track.

4. The system of claim 1, wherein the central controller communicates the motion profile for the reference mover to the segment controllers corresponding to the track segments in which the reference mover is traveling, and wherein the segment controllers execute the motion profile to move the reference mover by operating the plurality of drive coils of the segment controllers.

5. The system of claim 1, wherein each of the plurality of track segments further includes a plurality of position sensors spaced along the track segment, wherein each of the position sensors is operative to detect the at least one position magnet mounted to each mover of the plurality of movers and to generate a position feedback signal corresponding to the at least one position magnet detected in proximity to the position sensor.

6. The system of claim 1, further comprising a plurality of actuators arranged with respect to the synchronization zone, wherein the plurality of actuators are configured to interact with the plurality of movers when the plurality of movers are aligned with the plurality of actuators in the synchronization zone.

7. A linear drive system comprising:
a plurality of movers, wherein each mover of the plurality of movers includes at least one position magnet mounted to the mover;
a track including a plurality of track segments defining a path along which each mover of the plurality of movers travels, wherein each of the plurality of track segments includes:
(a) a plurality of drive coils spaced along the track segment; and
(b) a segment controller configured to operate the plurality of drive coils, wherein operating, a first drive coil of the plurality of drive coils proximal to a first mover of the plurality of movers causes the first mover to travel along a portion of the track segment; and
a central controller in communication with the segment controllers; and
a synchronization controller in communication with the central controller,
wherein motion of the first mover of the plurality of movers is determined according to a motion profile defined by the central controller or the segment controller of any of the plurality of track segment in which the first mover is traveling,
wherein a section of the track is a synchronization zone, wherein the motion of the first mover is determined according to a motion profile defined by the synchronization controller instead of the central controller or the segment controller of any of the plurality of track segments when the first mover is in the synchronization zone,
wherein the first mover is a grouped mover arranged in a group comprising the plurality of movers, wherein one mover of the plurality of movers is a reference mover and any other mover of the plurality of movers is a grouped mover, wherein motion of the reference mover is determined according to a motion profile defined by the central controller or the segment controller of any of the plurality of track segment in which the one or more grouped movers is traveling, and wherein motion of the one or more grouped movers is determined according to an offset with respect to the reference mover.

8. The system of claim 7, wherein each segment controller is configured to define a motion profile for the one or more grouped movers to cause the one or more grouped movers to maintain a predetermined separation distance from the reference mover.

9. The system of claim 7, wherein the reference mover leads the one or more grouped movers in a direction of travel along the track.

10. The system of claim 7, wherein the central controller communicates the motion profile for the reference mover to the segment controllers corresponding to the track segments in which the reference mover is traveling, and wherein the segment controllers execute the motion profile to move the reference mover by operating the plurality of drive coils of the segment controllers.

11. The system of claim 7, wherein each of the plurality of track segments further includes a plurality of position sensors spaced along the track segment, wherein each of the position sensors is operative to detect the at least one position magnet mounted to each of the plurality of movers and to generate a position feedback signal corresponding to the at least one position magnet detected in proximity to the position sensor.

12. The system of claim 7, wherein a motion profile for the one or more grouped movers in the synchronization zone is defined by the synchronization controller instead of the central controller or the segment controller of any of the plurality of track segments when the one or more grouped movers is in the synchronization zone.

13. The system of claim 12, further comprising a plurality of actuators arranged with respect to the synchronization zone, wherein each actuator of the plurality of actuators are configured to interact with the plurality of movers when the plurality of actuators are aligned with the plurality of movers in the synchronization zone.

\* \* \* \* \*